United States Patent

[11] 3,577,959

[72] Inventors Robert Owen Barratt
Parsippany;
John Polcer, Florham Park, N.J.
[21] Appl. No. 750,185
[22] Filed Aug. 5, 1968
[45] Patented May 11, 1971
[73] Assignee Foster Wheeler Corporation
Livingston, N.J.

[54] SATURATED STEAM SUPPLY SYSTEM FOR A STEAM COOLED FAST BREEDER REACTOR
16 Claims, 5 Drawing Figs.
[52] U.S. Cl. .................................................. 122/31,
176/60
[51] Int. Cl. ................................................ F23b 1/08
[50] Field of Search ..................................... 176/54, 55,
56, 60; 122/31, 32, 4; 261/23, 114; 55/257

[56] References Cited
UNITED STATES PATENTS
| | | | |
|---|---|---|---|
| 2,954,216 | 9/1960 | Otto ............................ | 261/23 |
| 3,048,957 | 8/1962 | Middleton .................... | 55/257 |
| 3,175,953 | 3/1965 | Nettel et al. ................. | 176/60 |
| 3,400,048 | 9/1968 | Boardman et al ............ | 176/60 |
| 3,400,049 | 9/1968 | Wolfe ........................... | 176/60 |

*Primary Examiner*—Kenneth W. Sprague
*Attorneys*—Constantine A. Michalos, John Maier, III and Marvin A. Naigur

ABSTRACT: A saturated steam supply system for a steam cooled fast breeder reactor power plant having mechanical spray desuperheaters for the first and second stage of desuperheating the reactor core superheated coolant steam and a bubble-through steam washing and final desuperheater contact boiler. The contact boiler having a vertically extending cylindrical vessel with a steam inlet at its lower level for receiving the two-stage desuperheated steam and directing it through a plurality of vertical concentric tube manifolds of ascending reduced cylindrical sizes which distribute the steam in bubble trays has bubble caps. The vessel also has a feed water inlet at its upper level for feed water which cascades from bubble tray to bubble tray for steam washing and final desuperheating of the steam. The steam is directed through mechanical separators and dryers and then leaves the contact boiler at the upper level of the vessel to be used as saturated steam coolant for the fast breeder reactor.

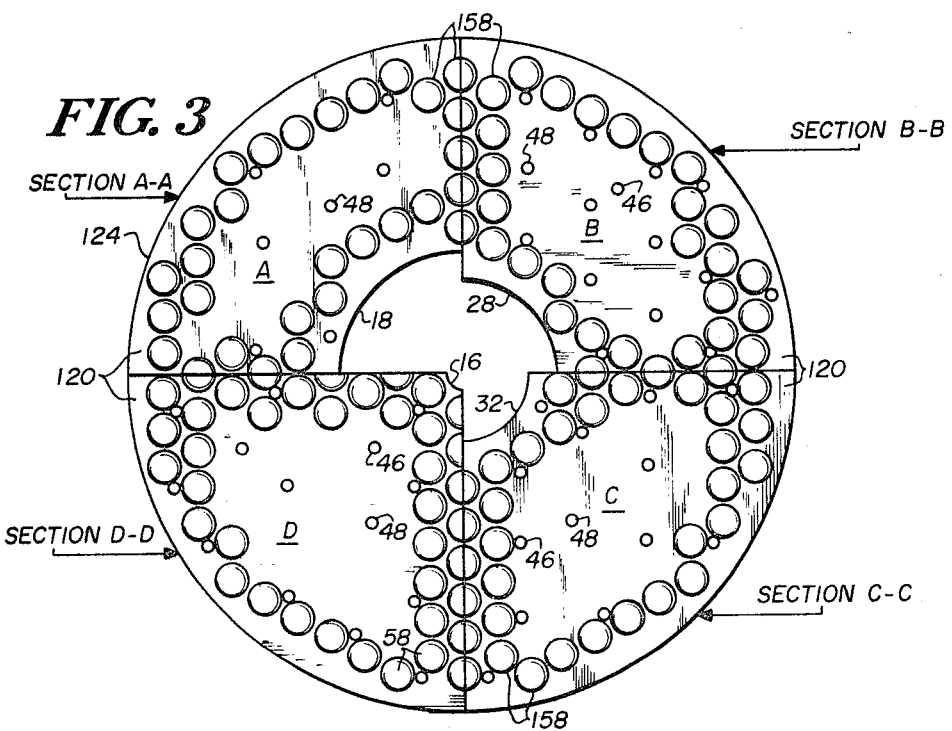
FIG. 3
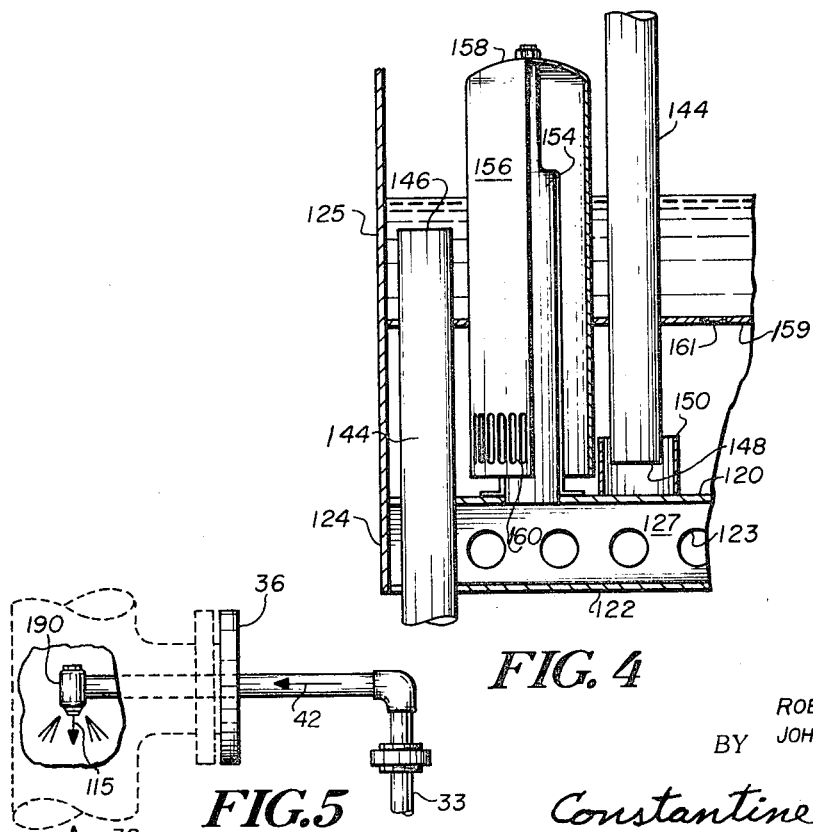
FIG. 4
FIG. 5
INVENTORS:
ROBERT OWEN BARRATT
BY JOHN POLCER
Constantine A. Michalos
ATTORNEY

SATURATED STEAM SUPPLY SYSTEM FOR A STEAM COOLED FAST BREEDER REACTOR

BACKGROUND OF THE INVENTION

This invention relates generally to nuclear reactor electric power plants, and particularly to a saturated steam supply system for a steam cooled fast breeder nuclear reactor electric power plant.

Heretofore, different systems were used in supplying clean saturated steam for steam cooled nuclear reactor plants for producing electricity. An inherent difficulty in the fast breeder nuclear reactor plant is that the superheated steam produced by passing steam coolant through the reactor core cannot be efficiently desuperheated to produce an adequate supply of saturated steam suitable for admission to the steam cooled fast breeder reactor.

In addition, the superheated steam produced by the nuclear reactor is contaminated with particulate matter and radioactivity.

SUMMARY OF THE INVENTION

In recent years considerable effort has been directed towards the development of thermal power plants for the long term generation of electric power through nuclear heat. There is a need for a steam cooled fast breeder reactor cycle to bring full superheated steam down to usable saturated steam and at the same time to remove entrained particulate and radioactive matter carried by the steam.

The present invention provides for desuperheating primary nuclear reactor core coolant steam to substantially complete desuperheated, washed and dried saturated steam of high quality by means of mechanical desuperheaters in combination with a contact boiler system utilizing spray and bubble-through steam desuperheating and washing technology.

Therefore, a primary object of this invention is to provide for a system for supplying saturated steam suitable for admission to a steam cooled fast breeder nuclear reactor.

Another object of this invention is to provide for a contact boiler device for maintaining particulate matter concentrations and radioactivity down to an acceptable level by processing the steam through water contained in multiple bubble trays within the contact boiler.

Another object of this invention is to provide for a steam cooled fast breeder reactor power system including a contact boiler which is capable of finally desuperheating the steam for the fast breeder reactor and which can be extrapolated to acceptable commercial sizes.

Another object of this invention is to provide for a steam washing and desuperheating system including spray desuperheaters for reducing the superheated steam temperature and a contact boiler system which further desuperheats the steam and washes it to remove entrained particulate matter by means of bubbling the steam through water.

A further object of this invention is to provide for a contact boiler system which can desuperheat, wash and dry high quality saturated steam when furnished with superheated primary reactor core coolant steam and feed water.

An additional object of this invention is to provide for a fluid circulating circuit of a fast breeder nuclear reactor power plant that converts its superheated primary reactor core coolant steam into substantially complete desuperheated steam by three stages of desuperheating, two stages of spray mechanical desuperheating, and a final stage of contact boiler bubble-through desuperheating.

Another and further object of this invention will be apparent from the following description and claims and may be understood by reference to the accompanying drawing, which by way of illustration, shows a preferred embodiment of the invention and what we now consider to be the best mode of applying the principles thereof. Other embodiments of the invention may be used without departing from the scope of the present invention as set forth in the appendant claims.

BRIEF DESCRIPTION OF THE DRAWINGS

FIG. 3 is a sectional view through the contact boiler of FIG. 2, showing one quadrant of each bubble cap tray displaying the gradual increase in the number of bubble caps as the section is taken at gradiated heights of the contact boiler, such as at sections A-A, B-B, C-C, and D-D of FIG. 2;

FIG. 4 is an enlarged detailed section through the liquid drain of a bubble cap tray showing a detailed sectional view of a bubble cap used in the contact boiler of FIGS. 2 and 3; and, FIG. 5 is an enlarged detailed section of one of the desuperheaters used in the system shown in FIG. 1.

DESCRIPTION OF THE PREFERRED EMBODIMENT

Figure 1:
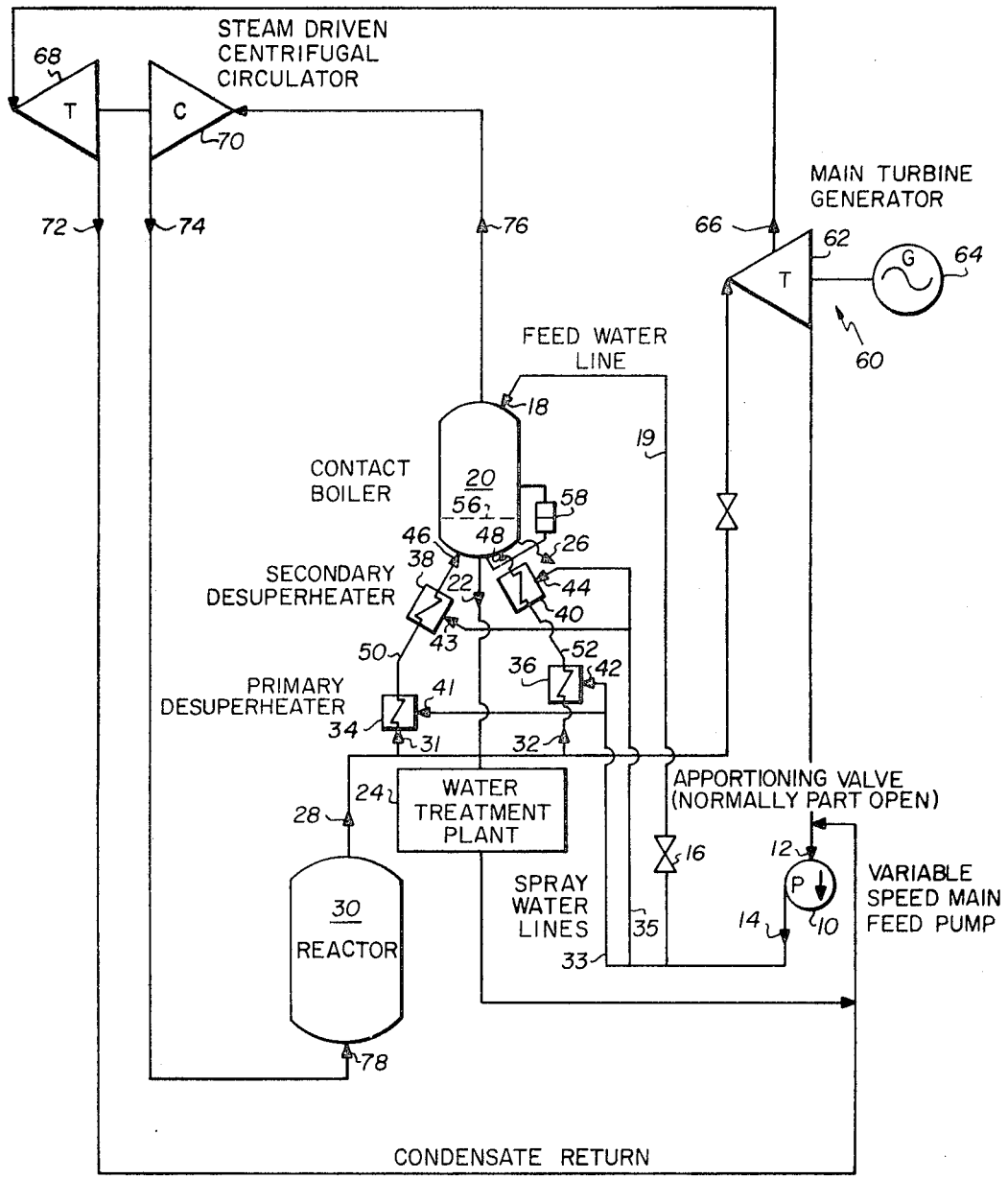
FIG. 1 is a diagrammatic illustration of a fluid-circulating circuit of a fast breeder nuclear reactor power plant including two stages of mechanical spray desuperheaters and a contact boiler in accordance with a preferred embodiment of the present invention.

Referring to the drawing and more particularly to FIG. 1, working fluid, such as water, is delivered to a recirculating pump 10, as shown by arrow 12, which pumps the water at a predetermined pressure in a direction shown by arrow 14 to several locations of the steam cooled fast breeder reactor power plant system. After passing through an apportioning valve 16 which is normally part open, the working water is directed as shown by arrow 18, by a main feed water pipeline 19, to a contact boiler 20 and through the contact boiler as hereinafter more fully described and shown in FIGS. 2, 3, 4 and 5. The water is stored at the lower portion of the contact boiler 20 to be blown down and drained, as shown by arrow 22, into a water treatment plant 24, to keep the water impurities to a certain defined minimum, and then returned to the pump 10. The excess water, the water above the normal water level at the bottom portion of the contact boiler, is directed as shown by arrow 26 through a feed water reheater train (not shown), and returned back to the pump 10, as shown by the arrow 12.

Simultaneously, superheated primary reactor core coolant steam is directed as shown by arrow 28, from a reactor 30 to the pipelines of first and second stage desuperheaters, as shown by arrows 31 and 32. The desuperheaters are comprised of a pair of primary mechanical spray desuperheaters 34 and 36 and a pair of secondary mechanical spray desuperheaters 38 and 40. Meanwhile, water directed from the feed pump 10 flows through spray pipelines 33 and 35 and enters the desuperheaters 34, 36, 38, and 40 as shown by arrows 41, 42, 43, and 44, respectively. Together the primary and the secondary desuperheaters reduce the superheated steam temperature down to roughly 50° F. above saturation temperature. The 50° F. superheated steam then enters the lower portion of the contact boiler 20, as shown by arrows 46 and 48 through two separate inlet nozzles passing upwards through the contact boiler 20, past four bubble stages to further desuperheat, wash, and dry the steam as hereinafter more fully explained.

Therefore, it should be noted that in order to guarantee saturated steam conditions, it will be necessary to install three stages of desuperheating. The first stage is comprised of the primary mechanical desuperheaters 34 and 36, such as of the variable orifice mechanical atomizing desuperheaters in which water is sprayed through orifices into the inlet steam lines with or against the steam flow, as shown in FIG. 5 and hereinafter more fully described. The desuperheaters would desuperheat the superheated primary reactor core coolant steam down to a predetermined superheat value. The second desuperheating stage is comprised of the secondary mechanical desuperheaters 38 and 40 which include spray nozzles and are similar to the first stage desuperheaters. The desuperheaters 38 and 40 are mounted downstream of bends 50 and 52 in pipes supporting the primary desuperheaters 34 and 36. Here the water quantity in this stage will be similar to the first stage and its final superheat temperature will be about 50°—70° F. The third stage and final desuperheating is accomplished within the contact boiler 20, as hereinafter more fully explained.

It should be noted that the make-up water to the contact boiler 20 is taken off the main feed water pipeline 19 upstream of the spray pipelines 33 and 35 of the mechanical desuperheaters. The flow ratio in this line compared with the mechanical desuperheaters is set during the startup by adjustment of the apportioning valve 16 in the feed water pipeline 19. The total feed water flow to the system is therefore maintained by the recirculating pump 10 which may be of a variable speed type. One of the parameters being used for control of the water within the contact boiler 20 to a normal predetermined water level 56 is the water level on the lowest bubble cap tray, as hereinafter more fully described, which in turn controls the pump 10 through a level control 58.

The fast breeder reactor 30 utilizing the steam coolant generates superheated steam from saturated steam supplied to it by the system. Two-thirds of this superheated steam passes via the two stages of desuperheating to the third stage of the contact boiler 20 and the other one-third of the superheated steam passes to a turbine generator 60 where it is expanded by a main turbine 62 to generate electricity by a generator 64. Partway through the expansion cycle of the turbine 62, some of the steam is bypassed, as shown by arrow 66, to a condensing steam-circulating turbine 68 which is used to drive a steam-driven compressor or centrifugal circulator 70. Condensing fluid from the main turbine 62 and steam-circulating turbine 68 is directed as shown by arrows 12 and 72, to be pressurized by means of the pump 10 and to be reused as a spray water for the primary and secondary superheaters 34, 36, and 38, 40, respectively, and as feed water for the contact boiler 20 as hereinbefore described.

Finally, saturated steam leaves the contact boiler 20, as shown by arrow 76, and is compressed by the turbine-driven compressor or circulator 70, prior to being led back to the reactor as supply of saturated steam as shown by arrow 78, for further cycle of superheating and desuperheating.

Figure 2:
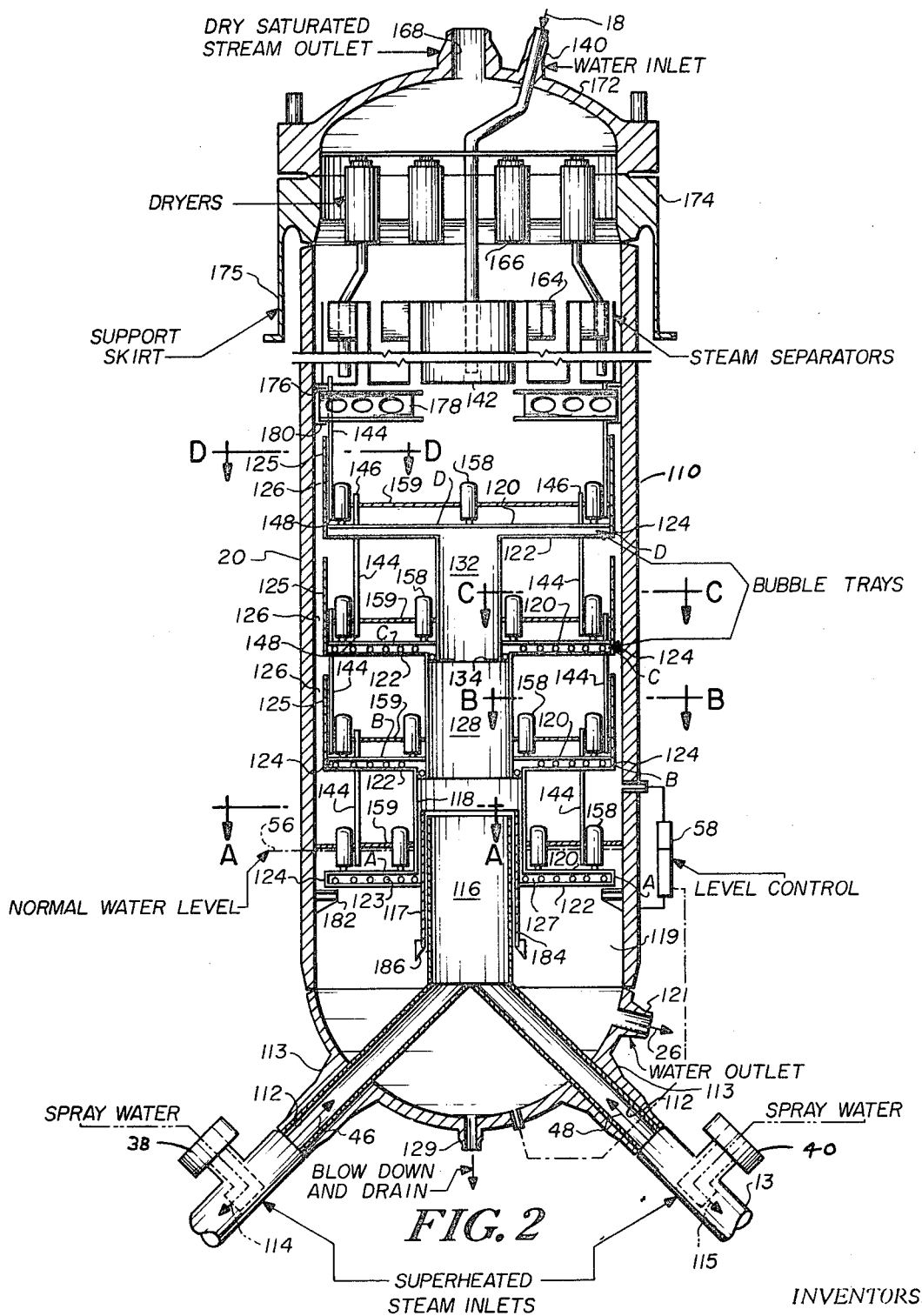
FIG. 2 is a vertical section through the contact boiler shown in FIG. 1.

Referring now to FIGS. 2 and 3 of the drawing, the contact boiler 20 comprises a vertically extending vessel 110 having a pair of superheated steam inlets 112 supported on a pair of thermal sleeves 113. Incoming steam of approximately 50° F. is directed, as shown by arrows 46 and 48, from the desuperheaters 38 and 40 into the steam inlets 112. The incoming steam receives spray water in a counterflow direction to the incoming steam from the desuperheaters 38 and 40, as shown by arrows 114 and 115.

The steam inlets 112 join into a master manifold inlet comprising a lower inlet tube 116 surrounded by a shroud 117, the upper portion of which in turn is surrounded by an outer manifold tube 118. The shroud sleeve 117 forms a hydraulic seal above water storage space 119 having an outlet 121 in the side and a blow down or drain nozzle 129, in the bottom of the vessel 110.

The inlet manifold delivers steam to superimposed separate shallow drums A, B, C, and D shown in FIGS. 2 and 3 at sections A–A, B–B, C–C, and D–D, respectively. As shown in FIG. 4, these drums each comprise a perforated upper tray 120, and a substantially imperforate bottom plate 122, which are joined by a circumferential wall 124. Radial partitions 127 are interposed between the tray 120 and the bottom plate 122 of each drum. These partitions are apertured as at 123, to avoid overloading at particular areas of the trays.

The walls 124 of each drum is of a smaller diameter than the interior of the vessel 110, to leave therebetween an annular passage 126 surrounding each of the drums B, C, and D. The upper part of the walls 124, except for drum A, forms a shroud 125, the top of which is spaced below the bottom plate 122 of the drum thereabove, for access from inside the shroud to the annular passage 126.

The bottom plate 122 of the lower drum A of section A–A has a central aperture for receiving and sealing the shroud 117. The inlet tube 116 terminates short of the top of shroud 117, and shroud 117 terminates short of the top of outer tube 118. With this arrangement, the outer part of the incoming steam flows over the top of inlet tube 116 and shroud 117 and down inside outer tube 118 into the lowest drum A of section A–A.

The telescopic relation of the shroud 117 to the inlet tube 116 serves to facilitate thermal growth effects resulting from the temperature difference existing between the vapor inlet and liquid drain phases. The steam and water are sealed against differential pressure by means of the hydraulic seal formed by the shroud 117 being above the water storage space 119. With increases in temperature, the manifold tubes 118, 128 and 132 tend to expand downwardly, and the inlet tube 116 tends to expand upwardly as a kind of inside tubular growth.

The top of the outer tube 118 is received in, and sealed to, the central aperture of the bottom plate 122 of drum B of section B–B. The upper tray 120 of drum B has a central aperture for receiving and sealing the smaller tube 128, which depends below the bottom plate 122 and inside the top of tube 118 therebelow. This leaves a space for the outer part of the remaining incoming steam to flow under the tube 128 and between the bottom plate 122 and the perforated tray 120, while the remainder of the steam continues on up tube 128.

The top of the tube 128 is received in, and sealed to, the bottom plate 122 of the drum C of section C–C. The perforated tray 120 thereof has a central aperture receiving and sealed to the smaller tube 132. The bottom of this tube extends down inside the top of the tube 128 therebelow. This leaves an annular space through which the outer part of the steam from the tube 128 enters the drum C. The lower end of the tube 132 is flanged inwardly at 134 to form a restricted orifice through which the remainder of the incoming steam passes up into the tube 132.

The top of the tube 132 is received in and sealed to the bottom plate 122 of the drum D of section D–D. The perforated tray thereof has no central orifice other than a perforation. The remainder of the incoming steam from the tube 132 passes into the drum D and up through the perforations thereof.

The shell 110 has a feed water inlet 140 which receives the feed water as hereinbefore described and is shown by arrow 18, and delivers it into a distributor 142 in the upper part thereof. Overflow drains 144 pass the water down through the distributor 142 from entrance orifices thereabove, and delivers it to the upper tray 120 of the drum D. Similar overflow drains 144 pass the water to drums C, B, and A.

The inlet 140 is supplied through the apportioning valve 16 actuated by the level control 58 responsive to the liquid level 56 of the water storage space 119. This serves to monitor the liquid level 56 in the water storage space 119, and in conjunction with the vapor and feed water flow, is used to regulate feed water flow to the inlet pipe 140. As shown in FIG. 4, the drain 144 has a top inlet orifice 146 spaced below the top of the shroud 125, and a bottom outlet orifice 148 spaced above the tray 120. The drain 144 depends into an antiblowback upstanding drain cup 150, the upper rim of which is above the level of the outlet orifice 148.

Also shown in FIG. 4 is a nozzle 154, one of which is inserted in each of the apertures of the upper tray 120 for each of the drums. The top of the nozzle is slabbed off to provide an outlet orifice 156. The sides of the nozzle above the orifice extend up to a threaded end which receives a bubble cap 158. The lower end of the bubble cap 158 is spaced upwardly from the tray 120, and is apertured as at 160.

The drain cup 150 prevents steam coming from the bubble cap 158 from entering the drain outlet orifice 148. Desuperheating is completed while the steam bubbles up through the water surrounding the partially immersed bubble trap. This forms a foam from which the steam is released. A secondary tray formed by a perforated plate 159 is provided for each drum suitably spaced above the tray 120 and apertured as at 161 to insure that the bubbles of steam coming out of the bubble cap 158 will not exceed the critical heat transfer.

The steam from each drum passes over the shroud 125 and up the outer annulus 126 in parallel flow and on up through liquid separations, such as described in U.S. Pat. No. 3,314,220 issued on Apr. 18, 1967, to Goldstein and assigned to Foster Wheeler Corp. which may include mechanical centrifugal separators 164 and a chevron dryer 166 in series near the top of the vessel, on through final dry saturated steam outlet 168.

The bubble tower vapor and liquid circuitry is arranged in the manner described to give a downward series liquid drain path and an upward parallel series vapor path in order to maintain sensibly equal vapor load on each tray and to insure that at all times all trays are adequately provided with liquid feed.

The shell 110 is supported by a flange 174 provided with a support skirt 175. A shell cover 172 is bolted to the flange 174. For access to the interior of the vessel 110 for inspection, the shell cover 172 is removed from the flange 174, and the chevron dryers 166 carried thereby are removed therewith. The distributor 142 is bolted to a support bracket 176, and it can be released by long bolts from the open top. The mechanical separator 164 carried by the distributor 142 is removable therewith.

The inlet manifold and the four drums A, B, C, and D are formed as an integral structure, which is supported by radial beams 178. These beams can be retracted from brackets 180 to lower the integral structure to rest the drum A on a temporary support 182. After this, the integral structure can be hoisted out of the vessel 110. The inlet shroud 117 slides over the top of the stationary inlet 116 and is provided with guide lugs 184 having beveled edges 186 for the return installation.

In the operation of the system, superheated primary reactor core coolant steam is directed, as shown by arrow 28, from the reactor 30 for the first stage of desuperheating in desuperheaters 34 and 36, as shown by arrows 31 and 32.

As best shown in FIG. 5, each desuperheater is comprised of a spray nozzle 190 directing a spray of water, as shown by arrow 115, counterflow to the steam flow shown by arrow 32. The nozzle 190 is spring loaded and as the system load increases, the nozzle orifice is open, allowing more cooling water to be forced in counterflow relation to the steam flow for rapid cooling.

After the steam is desuperheated in the first or primary desuperheating stage of desuperheaters 34 and 36, it passes through the second or secondary desuperheater stage comprised of desuperheaters 38 and 40. The steam, which would be approximately 50° superheated, will enter the bottom of the contact boiler 20 through the two separate steam inlets 112 and merge upwardly in parallel flow through bubble caps 158 of the four bubble stages of the four drums A, B, C, and D.

The steam going through the bubble caps 158 will be cleaned and desuperheated and flow upwardly from each stage between the bubble cap trays outside diameter and the inside diameter of the vessel 110, and up via the annular passages 126 into the primary water separation stage. The primary steam-water separation is accomplished with the vertical centrifugal separators and then the steam is finally dried in chevron-type dryer boxes, prior to exiting out of the vessel 110.

Meanwhile, feed water enters the top of the vessel through the inlet pipe 140, as shown by arrow 18, and flows down through the top of the vessel 110 to the distributor 142. Feed water spreads out and mixes with the water which has been separated by the centrifugal separators and flows down through the drains 144 to the uppermost stage of the bubble cap trays. Water then cascades by the drain arrangement down through each stage of bubble cap trays until it finally fills the vessel bottom at the first stage of the water storage space 119.

Feed control can be governed by the water level at the bottom stage within the water storage space 119. Some delay will need to be built into the control system because of the time necessary to cascade water down through the various stages.

At the bottom of the vessel 110, concentrated contaminates are removed from the contact boiler water by blow down through the drain nozzle 129 to the water treatment plant 24. While desuperheated, the washed and dried high quality saturated steam is directed from the contact boiler 20 as shown by arrow 76, to the steam-driven centrifugal circulator 70 where it is compressed and supplied as saturated steam, as shown by arrow 78, to the reactor 30.

The several cycles of desuperheating and washing of the steam reduce the particulate and radioactive matter carried by the steam so as to provide an adequate supply of saturated clean steam to the reactor. The superheated steam from the reactor can then be directed to the main turbine-generator 60 for producing electricity while the contact boiler 20 substantially reduces the radioactivity in the steam to said turbine-generator 60.

A latitude of modification, change and substitution is intended in the foregoing disclosure and in some instances some features of the invention will be employed without a corresponding use of other features. Accordingly, it is appropriate that the appended claims be constructed broadly and in a manner consistent with the spirit and scope of the invention.

We claim:

1. A saturated steam supply system for a steam cooled fast breeder reactor power plant comprising desuperheater means for reducing the superheat of a reactor core superheated coolant steam to a predetermined value and a contact boiler having a plurality of bubble trays, vertically extending concentric tube manifold of an ascending reduced cylindrical size for distributing the steam in said bubble trays, bubble caps for receiving the said steam within said trays, and feed water directed at the upper level of said vessel and operably cascading from bubble tray to bubble tray for steam washing and final desuperheating of the steam as it is directed upwardly through said vessel, said desuperheater means includes a first stage primary mechanical desuperheater having at least one mechanical spray desuperheater for initially receiving the reactor core superheated coolant steam and desuperheating it to a predetermined value, and a second stage secondary desuperheater including at least one mechanical spray desuperheater for reducing the initially desuperheated steam down to a lower desuperheated value. Said mechanical spray desuperheater includes a load controlled nozzle for directing a predetermined amount of cooling water within the desuperheated steam directed therethrough for reducing said superheated steam down to a predetermined value.

2. The structure of claim 1 wherein the spray water is directed counterflow to the steam flow within said mechanical spray desuperheaters.

3. A saturated steam supply system for a steam cooled fast breeder reactor power plant comprising desuperheater means for reducing the superheat of a reactor core superheated coolant steam to a predetermined value and a contact boiler having a plurality of bubble trays, vertically extending concentric tube manifold of an ascending reduced cylindrical size for distributing the steam in said bubble trays, bubble caps for receiving the said steam within said trays, and feed water directed at the upper level of said vessel and operably cascading from bubble tray to bubble tray for steam washing and final desuperheating of the steam as it is directed upwardly through said vessel, said contact boiler including a vertical cylindrical vessel, and said tube manifold including a vapor inlet manifold located at the bottom portion of said vessel and said vessel supporting a plurality of drums having bubble trays for receiving the cascading water downwardly therethrough and said trays including said bubble caps for receiving the superheated steam operably therethrough, whereby the steam is bubbled through said water for removing particulate matter and other radioactive matter while desuperheating the superheated steam down to a saturated steam.

4. The structure of claim 3 wherein said contact boiler further includes centrifugal force separators and dryers for drying said saturated steam after passing through said bubble trays.

5. A saturated steam supply system for a steam cooled fast breeder reactor power plant comprising desuperheater means for reducing the superheat of a reactor core superheated coolant steam to a predetermined value and a contact boiler having a plurality of bubble trays, vertically extending concentric tube manifold of an ascending reduced cylindrical size for distributing the steam in said bubble trays, bubble caps for receiving the said steam within said trays, and feed water directed at the upper level of said vessel and operably cascading from bubble tray to bubble tray for steam washing and final desuperheating of the steam as it is directed upwardly through said vessel, said contract boiler including a vertical cylindrical shell, a vapor manifold having an inlet at the bottom of said shell and said tube manifold including the concentric tubes of gradiated heights, each tube being of a smaller diameter thereby operably allowing an increase of the number of bubble caps on the gradually elevated bubble trays to more efficiently clean and desuperheat said steam as it goes upwardly through said bubble trays.

6. A saturated steam supply system for a steam cooled fast breeder reactor power plant comprising desuperheater means for reducing the superheat of a reactor core superheated coolant steam to a predetermined value and a contact boiler having a plurality of bubble trays, vertically extending concentric tube manifold of an ascending reduced cylindrical size for distributing the steam in said bubble trays, bubble caps for receiving the said steam within said trays, and feed water directed at the upper level of said vessel and operably cascading from bubble tray to bubble tray for steam washing and final desuperheating of the steam as it is directed upwardly through said vessel, said contact boiler including a vertical cylindrical vessel, and said tube manifold including a vapor inlet manifold at the bottom of said vessel having pairs of concentric tubes of gradiated heights, each pair of said concentric tubes including a lower outer tube and a higher inner tube, bubble drums having central apertures through which said tubes pass, each drum including a perforated upper tray and a substantially imperforated bottom plate, said lower outer tube being secured in the aperture of said bottom plate, and said higher inner tube being secured in the aperture of said perforated upper tray, a liquid inlet in the top of said shell in flow communication with the perforated tray of the uppermost drum, each drum having a water overflow drain and an inlet spaced above the perforated tray for delivering water to the perforated tray of the drum therebelow, said vessel having a vapor outlet in the top thereof, and said drums being of smaller diameter than the interior of said shell to leave an annular vertical passage open to the space between said drums for receiving parallel steam flow from each of said spaces.

7. A contact boiler as claimed in claim 6, in which upstanding vapor nozzles are secured in the perforations of said upper trays, and bubble caps are secured over said nozzles.

8. A contact boiler as claimed in claim 6, in which said overflow drains have lower ends spaced above the respective trays therebelow, and said respective trays having upstanding cups surrounding said lower ends of said drains and having upper rims spaced above said lower ends.

9. A contact boiler as claimed in claim 6, in which said trays have spacer partitions orificed in order to avoid overloading of a particular tray.

10. A contact boiler as claimed in claim 6, in which a secondary tray is mounted above the perforated tray of each drum, and apertured to insure that the steam coming out of the drum top will not exceed a predetermined diameter.

11. A contact boiler as claimed in claim 6, in which chevron dryers are mounted above the topmost drum, for drying saturated steam directed through said vessel and removable with the cover of the shell for necessary repairs or exchange.

12. A contact boiler as claimed in claim 6, comprising a liquid distributor mounted above the topmost drum and a mechanical separator mounted on said liquid distributor for separating the steam from the water and removable therewith for necessary repairs or exchange.

13. A contact boiler as claimed in claim 6, in which said inlet manifold and drums are integrally mounted and removable from the shell as a unit.

14. A contact boiler as claimed in claim 6, in which the lowest drum has a central shroud which telescopes over an inlet tube for said manifold, to facilitate thermal growth effects resulting from temperature difference existing between the vapor inlet and liquid drain phases, and sealed against differential pressure by means of a hydraulic seal.

15. A contact boiler as claimed in claim 6, in which superheated steam on its way to the manifold is subjected to a feed water spray for washing and desuperheating it.

16. A contact boiler as claimed in claim 6, in which the vapor and liquid circuitry is arranged to give a downward series liquid drain path and an upward parallel series vapor path in order to maintain sensible equal vapor load on each tray and to insure that at all times all trays are adequately provided with liquid feed.

UNITED STATES PATENT OFFICE
CERTIFICATE OF CORRECTION

Patent No. 3,577,959                Dated May 11, 1971

Inventor(s) Robert Owen Barratt, et. al.

It is certified that error appears in the above-identified patent and that said Letters Patent are hereby corrected as shown below:

Column 6, line 48, "value. Said" should read -- value, said -- .

Signed and sealed this 12th day of December 1972.

(SEAL)
Attest:

EDWARD M. FLETCHER, JR.                ROBERT GOTTSCHALK
Attesting Officer                      Commissioner of Patents